Bisbee & Hearn,
Hasp Lock.
No. 83,906. Patented Nov. 10, 1868.

Witnesses.
Wm A Morgan
G. C. Cotton

Inventors:
W. Bisbee
F. G. Hearn
per Munn & Co
attorneys

UNITED STATES PATENT OFFICE.

WILLIAM BISBEE AND FLEMING G. HEARN, OF YREKA, CALIFORNIA.

IMPROVEMENT IN SELF-ADJUSTING HOOKS.

Specification forming part of Letters Patent No. 83,906, dated November 10, 1868.

*To all whom it may concern:*

Be it known that we, WILLIAM BISBEE and FLEMING G. HEARN, of Yreka, in the county of Siskiyou and State of California, have invented a new and useful Improvement in Self-Adjusting Hook; and we do hereby declare that the following is a full, clear, and exact description thereof, which will enable others skilled in the art to make and use the same, reference being had to the accompanying drawings, forming part of this specification.

Figure 1:
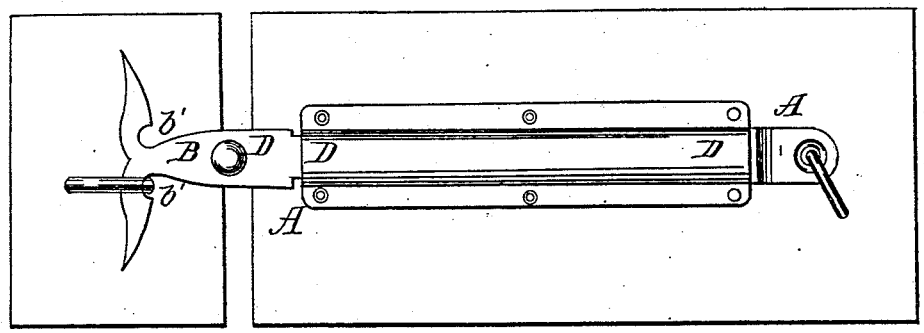
Figure 2:
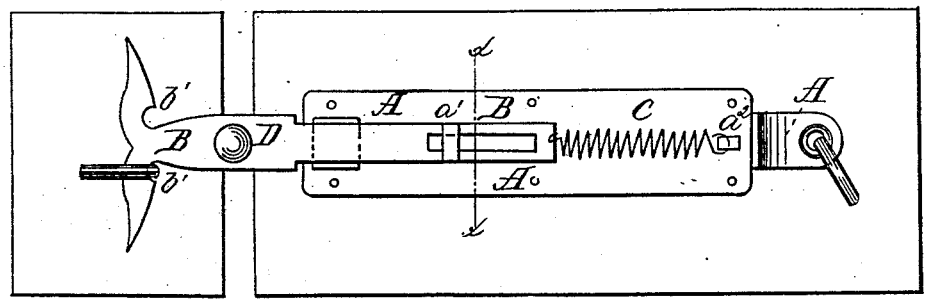
Figure 3:

Figure 1 is a front view of our improved hook. Fig. 2 is the same view as Fig. 1, the box or cap being removed. Fig. 3 is a detail cross-section of the same, taken through the line $x$ $x$, Fig. 2.

Similar letters of reference indicate corresponding parts.

Our invention has for its object to improve the construction of our improved hook patented December 31, 1867, and numbered 72,784, so as to make it more convenient and effective in operation; and it consists in forming notches in the inner side or sides of the head of the hook.

A is the strap or hasp of the hook, one end of which is connected to the door by a staple in the ordinary manner. B is the hook, the inner end of the body or shank of which is slotted and passed over the guide and stoppin $a^1$, attached to the strap A. C is a coiled-wire spring, one end of which is attached to the end of the hook B, and the other end of which is attached to an ear, $a^2$, attached to the strap A near its rear end.

This construction enables the hook to accommodate itself to the shrinking and swelling of the doors and other wood-work consequent upon the change from wet to dry and from dry to wet weather.

D is a cap or box, which covers and protects the spring C and the rear end of the hook B, as shown in Figs 1 and 3. The head of the hook may be made double, as shown in Figs. 1 and 2, or single, as may be desired or convenient, according to the purpose for which the hook is to be used.

Upon the inner side of the head or heads of the hook B, close to the body of said hook, is formed a deep notch, $b'$, as shown in Figs. 1 and 2, which receives the staple or catch into which the said hook hooks, so that it cannot be unhooked without first drawing the said hook forward till the said notch has been raised away from the said staple, when the hook may be unhooked in the ordinary manner.

To enable the hook B to be drawn forward conveniently against the action of the spring C, a knob or handle, D, is formed upon or attached to the body of the hook B, as shown in Figs. 1 and 2.

We claim as new and desire to secure by Letters Patent—

Forming a notch, $b'$, upon the inner side of the head or heads of the hook B, substantially as herein shown and described, and for the purpose set forth.

WILLIAM BISBEE.
FLEMING G. HEARN.

Witnesses:
H. S. SLICER,
HENRY CONROY.